US008862350B2

(12) United States Patent
Heap et al.

(10) Patent No.: US 8,862,350 B2
(45) Date of Patent: Oct. 14, 2014

(54) METHOD AND APPARATUS FOR CONTROLLING A MULTI-MODE POWERTRAIN SYSTEM

(75) Inventors: Anthony H. Heap, Ann Arbor, MI (US); Lawrence A. Kaminsky, White Lake, MI (US); Sean W. McGrogan, Ann Arbor, MI (US); Krunal P. Patel, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 13/568,638

(22) Filed: Aug. 7, 2012

(65) Prior Publication Data

US 2014/0046517 A1   Feb. 13, 2014

(51) Int. Cl.
| | |
|---|---|
| *G06F 7/00* | (2006.01) |
| *G06F 17/00* | (2006.01) |
| *G06F 19/00* | (2011.01) |
| *B60K 17/00* | (2006.01) |
| *B60K 20/00* | (2006.01) |
| *B60K 23/00* | (2006.01) |

(52) U.S. Cl.
USPC ............... 701/61; 701/51; 701/22; 180/336; 477/20; 477/54

(58) Field of Classification Search
CPC ......... G06F 19/00; G06F 15/00; G06F 17/00; G06F 7/70; B60K 6/48; B60K 6/20; B60K 1/02; B60K 28/16; B60K 6/442; F02D 28/00; F02D 17/02; F02D 41/022; F02D 41/042
USPC .......... 701/22, 51, 61; 477/3, 20, 54; 180/336
See application file for complete search history.

(56) References Cited

U.S. PATENT DOCUMENTS

| | | | | |
|---|---|---|---|---|
| 6,379,281 | B1 * | 4/2002 | Collins et al. ................. | 477/107 |
| 7,107,135 | B2 * | 9/2006 | Soliman et al. ................. | 701/55 |
| 7,645,206 | B2 | 1/2010 | Holmes et al. | |
| 2003/0022752 | A1 * | 1/2003 | Liu et al. ......................... | 477/43 |
| 2005/0181907 | A1 * | 8/2005 | Colvin et al. .................... | 477/3 |
| 2006/0020384 | A1 * | 1/2006 | Smith et al. ..................... | 701/54 |
| 2006/0194670 | A1 * | 8/2006 | Heap et al. ...................... | 477/3 |
| 2006/0293149 | A1 * | 12/2006 | Landes ......................... | 477/181 |
| 2007/0259755 | A1 * | 11/2007 | Tanishima ........................ | 477/3 |
| 2008/0058152 | A1 * | 3/2008 | Ortmann ........................... | 477/3 |
| 2009/0076691 | A1 * | 3/2009 | Burke et al. ..................... | 701/54 |
| 2009/0112385 | A1 * | 4/2009 | Heap et al. ...................... | 701/22 |
| 2009/0209381 | A1 * | 8/2009 | Ai et al. ........................... | 475/5 |
| 2010/0131164 | A1 * | 5/2010 | Carter et al. .................... | 701/61 |
| 2010/0179009 | A1 | 7/2010 | Wittkopp et al. | |
| 2010/0323844 | A1 * | 12/2010 | Okubo et al. .................... | 477/3 |
| 2011/0021310 | A1 * | 1/2011 | Kresse et al. .................... | 477/3 |
| 2011/0034296 | A1 * | 2/2011 | Stervik ............................. | 477/3 |
| 2012/0010791 | A1 * | 1/2012 | Conn et al. ...................... | 701/54 |

* cited by examiner

*Primary Examiner* — Calvin Cheung
*Assistant Examiner* — Luis A Martinez Borrero (57) ABSTRACT

A powertrain system includes a multi-mode transmission configured to transfer torque among an engine, torque machines, and a driveline. A method for controlling the powertrain includes executing a dual closed-loop control scheme that includes determining an engine-based output torque range employed in a first feedback loop and simultaneously determining a control acceleration-based output torque range employed in a second feedback loop. Engine commands are controlled responsive to the engine-based output torque range and simultaneously a control acceleration is controlled responsive to the control acceleration-based output torque range to achieve an output torque of the powertrain system responsive to an output torque request.

10 Claims, 3 Drawing Sheets

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes a multi-mode transmission configured to transfer torque among an engine, torque machines, and a driveline. A method for controlling the powertrain includes executing a dual closed-loop control scheme that includes determining an engine-based output torque range employed in a first feedback loop and simultaneously determining a control acceleration-based output torque range employed in a second feedback loop. Engine commands are controlled responsive to the engine-based output torque range and simultaneously a control acceleration is controlled responsive to the control acceleration-based output torque range to achieve an output torque of the powertrain system responsive to an output torque request.

BRIEF DESCRIPTION OF THE DRAWINGS

One or more embodiments will now be described, by way of example, with reference to the accompanying drawings, in which:

FIGS. 3-1 and 3-2 illustrate operation of the control scheme shown in FIG. 2, including imposition of various torque constraints in relation to time in a fixed gear range and a variable mode range, in accordance with the disclosure.

DETAILED DESCRIPTION

Figure 1:
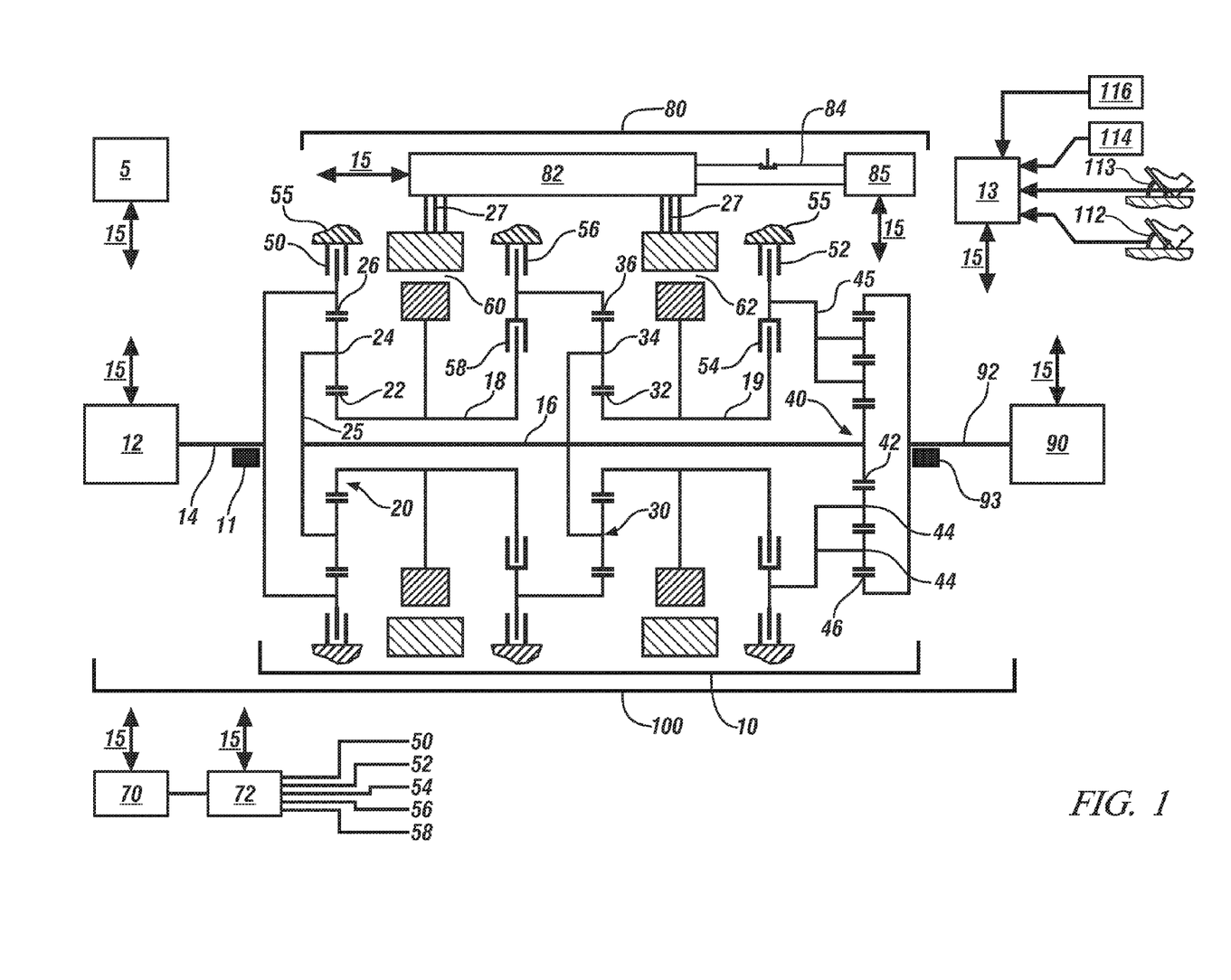
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear set 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, including generating an output torque request. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event. Routines executed at regular intervals may be referred to as loop cycles.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | | x | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | x | | | x |
| Gear 1 | ON(ALL/DEAC/FCO) | x | | x | x | |
| Gear 2 | ON(ALL/DEAC/FCO) | x | x | | x | |
| Gear 3 | ON(ALL/DEAC/FCO) | | x | x | x | |
| EV1 | OFF | x | | x | | x |
| EV2 | OFF | x | | | x | x |
| EV3 | OFF | | x | | x | x |
| EV4 | OFF | | | x | x | x |
| EV Transitional State 3 | OFF | x | x | | | x |
| Neutral | ON(ALL/DEAC/FCO)/OFF | | | x | x | |
| PseudoGear 3 | ON(ALL/DEAC/FCO)/OFF | x | x | | | |
| Neutral | OFF | | | x | | x |
| Neutral | OFF | | | | x | x |

Figure 2:
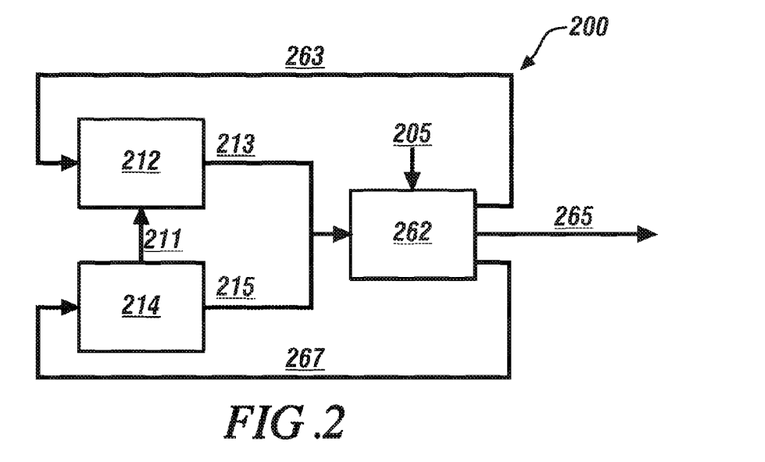
FIG. 2 illustrates an embodiment of a dual closed-loop control scheme for controlling a system include including a first actuator, a second actuator, and a torque/output actuator including a multi-mode transmission and one or a plurality of torque machines that are configured to generate an output torque, in accordance with the disclosure.

A loop-to-loop output torque command to the engine is coupled to a control acceleration command through separate feedback output torque ranges. A dual closed-loop control scheme 200 intervenes to simultaneously modify engine and control acceleration commands to ensure the next loop output torque remains within an output torque range to provide smooth output torque shaping, especially when fine control is needed such as during a gear lash transition. An intervention in the engine command involves deviating from the normal desired response to cut engine torque through spark or raise air torque through throttle and/or fuel control. An intervention in the control acceleration(s) involves deviating from the desired acceleration profile.

FIG. 2 schematically shows an embodiment of the dual closed-loop control scheme 200 including a first actuator 212 including an engine, a second actuator 214 including control acceleration(s), and a torque/output actuator 262 that includes an internal combustion engine coupled to a multi-mode transmission including one or a plurality of torque machines that are configured to generate an output torque 265 to an output member in response to an output torque command 205. The control scheme 200 may be employed on any suitable torque/output actuator 262 on which the concepts described herein apply, including an embodiment of the powertrain system 100 coupled described with reference to FIG. 1. A first feedback loop from the torque/output actuator 262 includes a feedback range including an engine-based output torque range 263 that is employed to control the first actuator 212, i.e., the engine. A second feedback loop includes a feedback range including a control acceleration-based output torque range 267 that is employed to control the second actuator 214, i.e., control acceleration(s). In one embodiment, the second actuator 214 includes an output member acceleration from the transmission 10, as described herein. A desired control acceleration range 211 is output from the second actuator 214 and provided to the first actuator 212, indicating a control acceleration range for achieving a transition in the output torque 265, such as for gear lash management.

Figure 31:
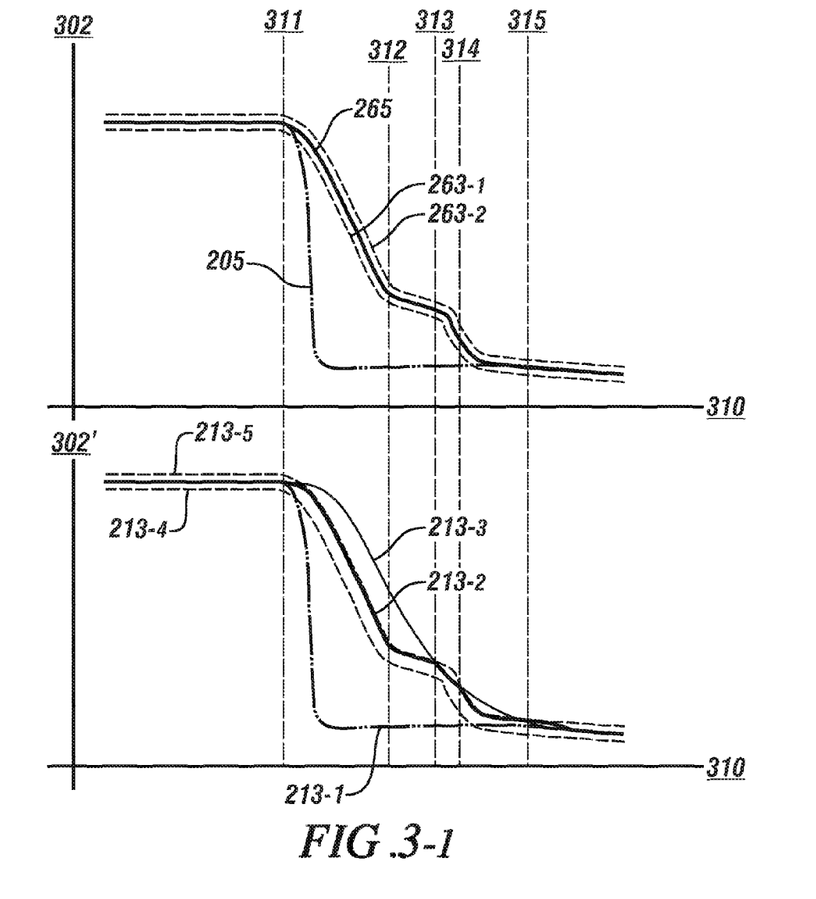
Figure 32:
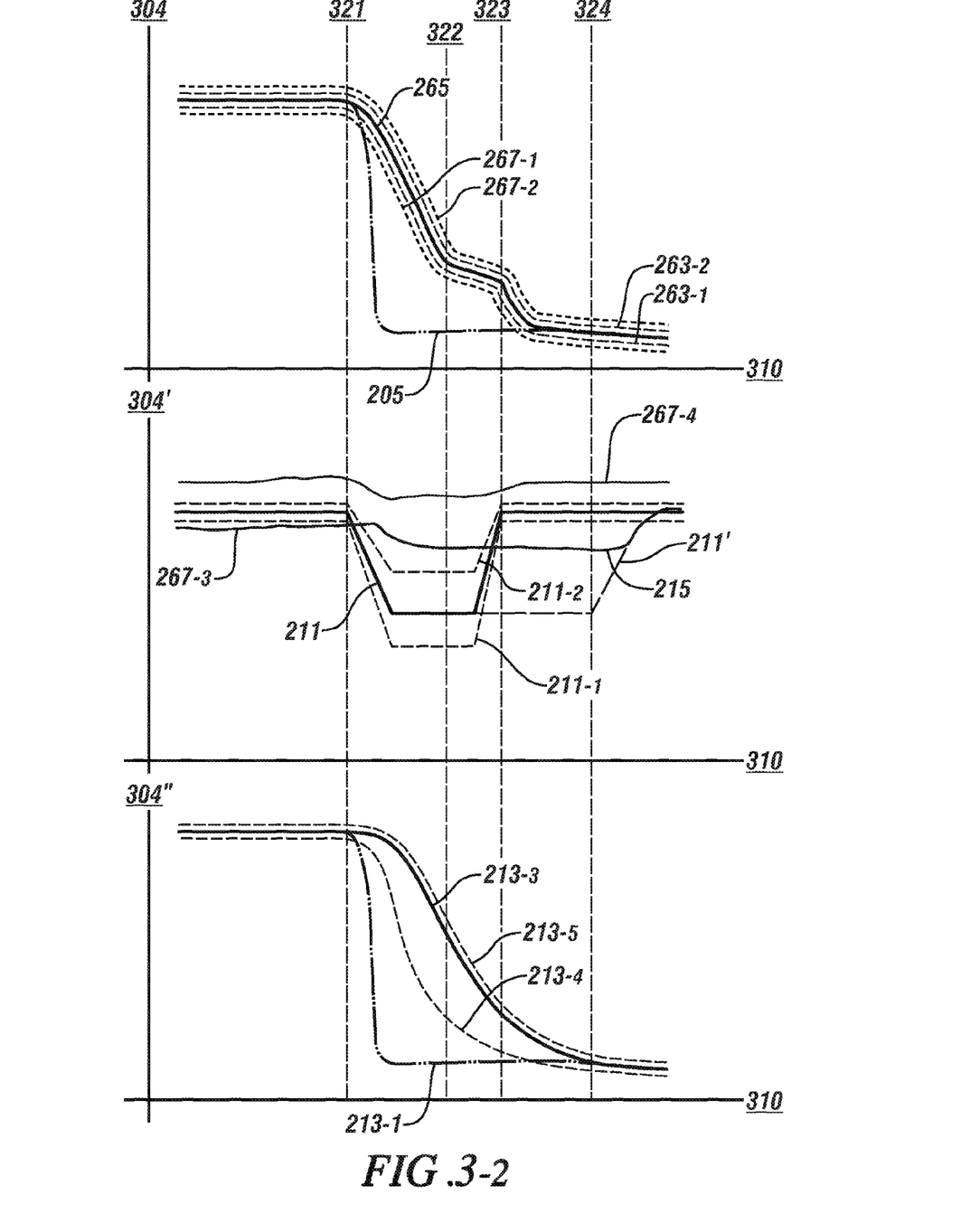

FIGS. 3-1 and 3-2 graphically show operation of the control scheme 200, including imposition of various torque constraints in relation to time under circumstances as described herein. This includes operation in a fixed gear range as shown in FIG. 3-1 and a variable mode range as shown in FIG. 3-2. The dual closed-loop control scheme 200 provides coordinated coupling of the output torque 265 from a first loop-cycle to an immediately subsequent second loop-cycle during ongoing operation, including shaping a trajectory of the output torque 265 by controlling the engine and control acceleration commands through separate feedback output torque ranges, with the output torque ranges including minimum and maximum output torque-control acceleration 267-1 and 267-2, respectively and minimum and maximum engine-based output torque range 263-1 and 263-2, respectively. The relative magnitudes of the control acceleration-based output torque range 267 and the engine-based output torque range 263 can indicate relative prioritization of the control acceleration commands as compared to the engine torque commands. The control scheme 200 is configured to intervene in controlling the torque/output actuator 262 by modifying one or both engine commands 213 and control acceleration commands 215 to ensure the output torque command 265 for the next loop remains within an output torque range to provide smooth output torque shaping, including during operating conditions when fine torque control is required, e.g., a lash transition. Modifying the engine commands 213 includes deviating from a normal desired response to reduce engine torque through spark control or deviating from the normal desired response to increase air torque through throttle control. Modifying the control acceleration commands 215 includes deviating from a desired acceleration profile and thus allow for a longer time to execute a shift. Prioritization between the engine commands 213 and the control acceleration commands 215 is dictated by relative magnitudes of the respective output torque ranges. For example, in response to an operator tip-out of the accelerator pedal, the prioritization may include a preference to employ the engine commands 213 to retard spark timing to meet a desired control acceleration. Alternatively, on an operator tip-out, the prioritization may include a preference to employ the control acceleration commands 215 to meet a desired control acceleration and not retard spark timing and instead taking a longer amount of time to execute a shift.

An output torque request 205 is generated and input to the torque/output actuator 262, which generates an output torque command 265 that is employed to control operation of elements of the torque/output actuator 262. The torque/output actuator 262 also generates signals for first and second feedback loops, including the engine-based output torque range 263 that is input to the first actuator 212 and the control acceleration-based output torque range 267 that is input to the second actuator 214. The engine-based output torque range 263 includes allowable minimum and maximum engine output torques for controlling operation of the first actuator 212, i.e., the engine during execution in the next loop cycle. The control acceleration-based output torque range 267 includes allowable minimum and maximum control accelerations for controlling the second actuator 214 during execution in the next loop cycle.

The first actuator 212 generates a plurality of engine commands 213 for controlling operation in response to the engine-based output torque range 263 and the desired control acceleration 211 generated by the second actuator 214. The engine commands 213 preferably include an immediate engine torque request, a predicted engine torque request, and an engine air torque request. The predicted engine torque request is an engine torque request that is responsive to an output torque request, and represents a long-term expected engine torque. Thus, the predicted engine torque request immediately increases in response to an operator tip-in of the accelerator pedal, and immediately decreases in response to an operator tip-out of the accelerator pedal. The immediate engine torque request represents an engine torque command for controlling the engine that is responsive to the engine-based output torque range 263. The engine employs fast engine actuators, e.g., spark timing control or fuel injection timing control, or slow actuators, e.g., throttle/mass air control or fuel mass control, to control engine torque output in response to the immediate engine torque request. The engine air torque request represents an engine torque command for controlling the engine employing only the slow actuators, e.g., throttle/mass air control or fuel mass control, to ensure that the engine operates at a MBT-spark point in response to the output torque request or the predicted engine torque request. Examples of the aforementioned engine commands 213 are illustrated with reference to FIGS. 3-1 and 3-2.

When operating in one of the variable modes, torque and speed between various elements of the powertrain system 100 can be expressed as follows in the relationships of EQs. [1] and [2]. When operating in one of the fixed gears, torque and speed between various elements of the powertrain system 100 can be expressed as follows in the relationships of EQs. [3] and [4].

$$\begin{bmatrix} T_A \\ T_B \end{bmatrix} = [A2] * \begin{bmatrix} T_I \\ T_O \\ \bullet \\ N_I \\ \bullet \\ N_O \end{bmatrix} \quad [1]$$

$$\begin{bmatrix} N_I \\ N_A \\ N_B \end{bmatrix} = [B2] * N_O \quad [2]$$

-continued $$T_A = [A3] \begin{bmatrix} T_I \\ T_B \\ T_O \\ \bullet \\ N_I \end{bmatrix}$$ [3]

$$\begin{bmatrix} N_A \\ N_B \end{bmatrix} = [B3] * \begin{bmatrix} N_I \\ N_O \end{bmatrix}$$ [4]

wherein $T_A$ is a torque command for the first torque machine 60;
$T_B$ is a torque command for the second torque machine 62;
$T_I$ is an input torque command from the engine 12;
$T_O$ is an output torque command from the transmission 10;
$N_I$ is an input member speed from the engine 12;
$N_O$ is an output member speed from the transmission 10;
$\dot{N}_I$ is an input member acceleration from the engine 12, and can be employed as the control acceleration in one embodiment;
$\dot{N}_O$ is an output member acceleration from the transmission 10 and is preferably employed as the control acceleration described herein;
$N_A$ is a speed of the first torque machine 60;
$N_B$ is a speed of the second torque machine 62;
[A2] represents a 3×4 matrix of system-specific scalar values;
[B2] represents a 1×3 matrix of system-specific scalar values;
[A3] represents a 1×4 matrix of system-specific scalar values; and
[B3] represents 2×2 matrix of system-specific scalar values.

FIG. 3-1 graphically shows a plurality of powertrain torques in relation to elapsed time, and depicts operation of an embodiment of the powertrain system 100 with the transmission 10 operating in one of the fixed gear ranges while employing an embodiment of the dual closed-loop control scheme 200. When the transmission 10 is operating in one of the fixed gear ranges, the relationships of torques and relationships of accelerations are established using control equations in the form of EQs. [3] and [4]. The second actuator 214 associated with the control acceleration operates in relation to operation of the engine 212 and has no independent control. Thus, the second feedback loop including the control acceleration-based output torque range 267 that is input to the second actuator 214 is essentially non-functional.

The upper portion of FIG. 3-1 shows an output torque command 265 that is responsive to an output torque request 205 and an engine-based output torque range 263 on vertical axis 302 in relation to elapsed time on the horizontal axis 310. The lower portion of FIG. 3-1 shows a plurality of engine torque requests 213 on vertical axis 302' in relation to elapsed time on the horizontal axis 310. The engine-based output torque range includes a minimum engine-based output torque 263-1 and a maximum engine-based output torque 263-2 that are determined to ensure that the output torque for the next loop cycle provides smooth output torque shaping to eliminate or minimize driveline torque disturbances caused by changes in engine torque that may be discernible by the vehicle operator. The minimum engine-based output torque 263-1 and the maximum engine-based output torque 263-2 are shown in the upper portion of FIG. 3-1. The minimum engine-based output torque 263-1 and the maximum engine-based output torque 263-2 are employed to calculate engine torque constraints including a minimum engine torque constraint 213-4 and a maximum engine torque constraint 213-5, respectively, which are shown on the lower portion of FIG. 3-1.

As shown, at time point 311, the output torque request 205 reduces suddenly, e.g., in response to a tip-out of the accelerator pedal by the vehicle operator, which results in a corresponding reduction in a predicted engine torque request 213-1. The engine 12 preferably employs the engine air torque request 213-3 in commanding a response to the output torque request 205, unless the engine 12 is unable to achieve the output torque request 205 due to system latencies. When the engine 12 is unable to achieve the output torque request 205 employing the engine air torque response 213-3, an immediate engine torque request 213-2 is employed to control operation of the engine 12 to ensure that torque output from the engine 12 is within the minimum engine-based output torque 263-1 and the maximum engine-based output torque 263-2. Such operation is shown beginning at time point 311.

Between time points 312 and 313, the transmission 10 experiences a lash event wherein direction of the applied torque in the driveline transitions from a first direction to a second direction. In a tip-out event, the applied torque transitions from a first condition wherein the engine positively applies torque to the transmission to a second condition wherein the transmission positively applies torque to the engine, with the transition occurring during the lash event. At the end of the lash event at time point 313, as shown, the output torque command 265 changes such that the engine 12 is able to achieve the output torque request 205 employing the engine air torque response 213-3. Such operation occurs until time point 314, at which point the engine 12 is again unable to achieve the output torque request 205 employing the engine air torque response 213-3, and again employs the immediate engine torque request 213-2 to control operation of the engine 12. Such operation continues until time point 315 when the predicted engine torque request 213-1 converges with the output torque command 265 within the minimum engine-based output torque 263-1 and the maximum engine-based output torque 263-2, thus permitting operation of the engine 12 employing the engine air torque response 213-3.

FIG. 3-2 graphically shows a plurality of powertrain torques in relation to elapsed time, and depicts operation of an embodiment of the powertrain system 100 with the transmission 10 operating in one of the variable mode ranges while employing an embodiment of the dual closed-loop control scheme 200. When the transmission 10 is operating in one of the variable mode ranges, the relationships of torques and relationships of accelerations are established using control equations in the form of EQs. [1] and [2]. The first and second actuators 212 and 214 are independently controlled. Thus, the second feedback loop including the control acceleration-based output torque range 267 is functional.

FIG. 3-2 includes an upper portion, a middle portion and a lower portion. The upper portion shows an output torque command 265 that is responsive to an output torque request 205, and the feedback terms including the minimum and maximum output torques-engine 263-1 and 263-2, respectively and the minimum and maximum output torques-control acceleration 267-1 and 267-2, respectively. The aforementioned torques are depicted on the vertical axis 304 in relation to elapsed time on the horizontal axis 310. As shown, the magnitude of the control acceleration-based output torque range 267 is relatively smaller than the magnitude of the engine-based output torque range 263.

The middle portion includes a plurality of control accelerations, including the control acceleration command 215, the desired control acceleration range 211, a modified desired control acceleration range 211', and minimum and maximum control accelerations 267-3 and 267-4, respectively, which represent the minimum and maximum output torques-control acceleration 267-1 and 267-2, respectively that have been translated to accelerations using EQs. [1] and [2]. The aforementioned accelerations are depicted on vertical axis 304' in relation to elapsed time on the horizontal axis 310. The desired control acceleration 211 includes a desired control acceleration range including minimum and maximum desired control accelerations 211-1 and 211-2, respectively that are responsive to the output torque request 205.

The lower portion includes a plurality of engine torque requests 213 including the predicted engine torque request 213-1, the engine air torque response 213-3, and the engine torque constraints including the minimum and maximum engine torque constraints 213-4 and 213-5 on vertical axis 304" in relation to elapsed time on the horizontal axis 310.

As shown, at time point 321, the output torque request 205 reduces suddenly, e.g., in response to a tip-out of the accelerator pedal by the vehicle operator, which results in a corresponding reduction in a predicted engine torque request 213-1. The engine 12 preferably employs the engine air torque response 213-3 in commanding a response to the output torque request 205. The minimum and maximum control accelerations 267-3 and 267-4 are employed to determine the control acceleration command 215. The desired control acceleration 211 and the minimum and maximum desired control accelerations 211-1 and 211-2 are responsive to the output torque request 205.

Immediately after time point 321, the desired control acceleration 211 decreases in response to the output torque request 205, and is less than the minimum control acceleration 267-3. Instead of responding to the desired control acceleration 211, the control acceleration command 215 deviates from the desired control acceleration profile, limited by the minimum control acceleration 267-3. This includes such action at the beginning of a lash event at time point 322 and at the end of the lash event at time point 323. Thus, the control scheme extends the reduction in the control acceleration command 215 rather than responding to the initial desired control acceleration 211. Instead, the modified desired control acceleration 211' is commanded, which is an extension in time of the desired control acceleration 211. The engine air torque response 213-3 remains within the engine torque constraints including the minimum and maximum engine torque constraints 213-4 and 213-5, and thus no further control of the engine torque is required. At time point 324, the engine air torque response 213-3 converges with the engine torque request 213-1, and the control acceleration command 215 begins to increase, converging with the desired control acceleration 211, thus effecting ongoing control of the system. Thus, the system operates to modify the control acceleration commands 215 including deviating from a desired acceleration profile to manage power output.

The dual closed-loop control scheme 200 effects a coupled prioritization control of the control accelerations and engine torque, wherein a loop-to-loop output torque command to the engine is coupled to control acceleration commands through separate feedback output torque ranges. As necessary, the dual closed-loop control scheme 200 intervenes to modify the engine command and the control acceleration commands to ensure the next loop output torque remains within the output torque range to provide smooth output torque shaping, especially when fine control is needed like during a lash transition. An intervention in the engine command involves deviating from the normal desired response to reduce engine torque through spark retard or raise air torque through a throttle. An intervention in the control acceleration(s) involves deviating from the desired acceleration profile. Intervention prioritization between the engine torque and the control acceleration can be dictated by the relative magnitude of the respective output torque ranges. For example, on a operator tip-out, a decision is made to either retard spark acceleration or extend shift time to achieve a desired control. This permits the control scheme to be responsive to increasingly stringent battery power requirements and transmission range state requirements that couple engine torque and control accelerations directly to the output torque, thus permitting simultaneously coordination of all of the power/torque actuators. In these constrained conditions, output torque becomes largely or fully dictated by the combined loop-to-loop engine and control acceleration commands. The dual closed-loop control scheme 200 allows for coordinated coupling of the loop-to-loop output torque (including output torque trajectory shaping) with the engine and control acceleration commands through separate feedback output torque ranges to each.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system comprising a multi-mode transmission configured to transfer torque among an engine, torque machines, and a driveline, the method comprising:
   in response to an output torque request:
      executing, by a processor, a dual closed-loop control scheme including determining an engine-based output torque range employed in a first feedback loop and simultaneously determining a control acceleration-based output torque range employed in a second feedback loop, said control acceleration comprising acceleration of an output member coupled between the transmission and the driveline, and said control acceleration-based output torque range comprising a desired control acceleration range associated with a transition in output torque at the output member during a gear lash event;
      controlling engine commands responsive to the engine-based output torque range and simultaneously controlling the control acceleration responsive to the control acceleration-based output torque range to achieve an output torque of the powertrain system responsive to the output torque request.

2. The method of claim 1, wherein controlling engine commands responsive to the engine-based output torque range comprises:
   determining a minimum engine torque constraint based upon a minimum state of the engine-based output torque range and determining a maximum engine torque constraint based upon a maximum state of the engine-based output torque range; and
   generating engine commands responsive to the minimum and maximum engine torque constraints.

3. The method of claim 2, wherein generating engine commands responsive to the minimum and maximum engine torque constraints comprises employing an engine air torque request to control operation of the engine in response to the output torque request.

4. The method of claim 3, further comprising employing an immediate engine torque request to control operation of the engine in response to the output torque request when the engine air torque request exceeds one of the minimum and maximum engine torque constraints.

5. The method of claim 1, wherein controlling the control acceleration responsive to the control acceleration-based output torque range comprises:
- determining a minimum control acceleration and a minimum desired control acceleration based upon a minimum state of the control acceleration-based output torque range;
- determining a maximum control acceleration and a maximum desired control acceleration based upon a maximum state of the control acceleration-based output torque range; and
- generating control acceleration commands responsive to the minimum and maximum control accelerations and the minimum and maximum desired control accelerations.

6. The method of claim 5, wherein generating control acceleration commands responsive to the minimum and maximum control accelerations and the minimum and maximum desired control accelerations comprises modifying the minimum and maximum desired control accelerations to deviate from a desired acceleration profile to manage output power while controlling the control acceleration responsive to the control acceleration-based output torque range to achieve the output torque of the powertrain system responsive to the output torque request.

7. The method of claim 1, further comprising controlling the transmission in a fixed gear range while controlling the engine commands responsive to the engine-based output torque range and simultaneously controlling the control acceleration responsive to the control acceleration-based output torque range to achieve the output torque of the powertrain system responsive to the output torque request.

8. The method of claim 1, further comprising controlling the transmission in a variable range while controlling the engine commands responsive to the engine-based output torque range and simultaneously controlling the control acceleration responsive to the control acceleration-based output torque range to achieve the output torque of the powertrain system responsive to the output torque request.

9. A method for controlling a multi-mode powertrain system comprising actuators including an internal combustion engine and an output member having an output torque and an output acceleration, the method comprising:
- in response to an output torque request:
  - determining an engine feedback term employed in a first feedback loop for generating engine torque commands;
  - determining an output acceleration feedback term employed in a second feedback loop for generating control acceleration commands associated with the output acceleration of the output member;
  - providing a desired control acceleration range from the output member actuator to the engine actuator, said desired control acceleration range for achieving a transition in the output torque;
  - executing, by a processor, a dual closed-loop control scheme including simultaneously employing the engine feedback term in the first feedback loop and the desired control acceleration range to generate the engine torque commands to control the engine and employing the output acceleration feedback term in the second feedback loop to generate the control acceleration commands to control the output member responsive to the output torque request.

10. The method of claim 9, wherein said desired control acceleration range for achieving the transition in the output torque comprises said desired control acceleration range for achieving the transition in the output torque during a gear lash event.

* * * * *